S. OTIS.
DUMP CAR.
APPLICATION FILED JULY 22, 1905.
1,061,004.
Patented May 6, 1913.
6 SHEETS—SHEET 2.
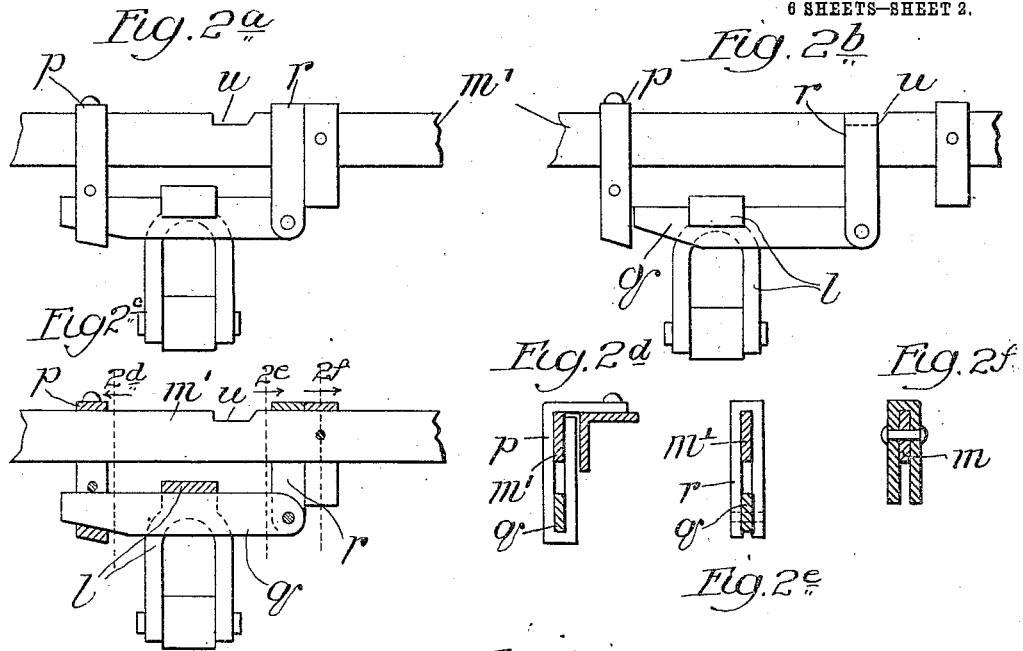
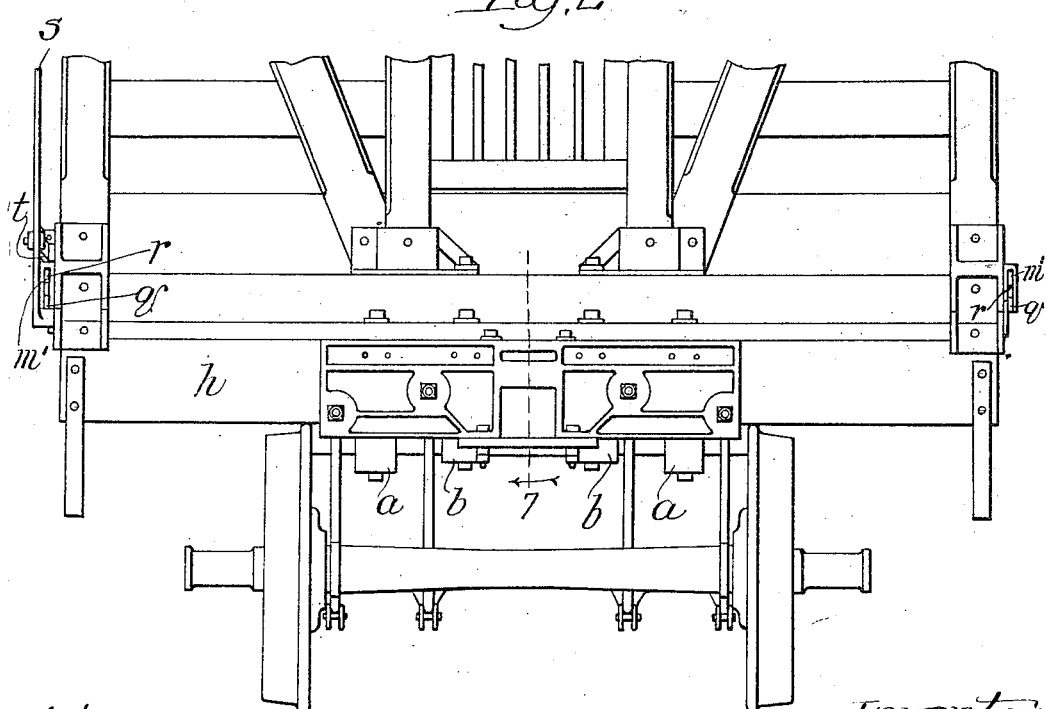

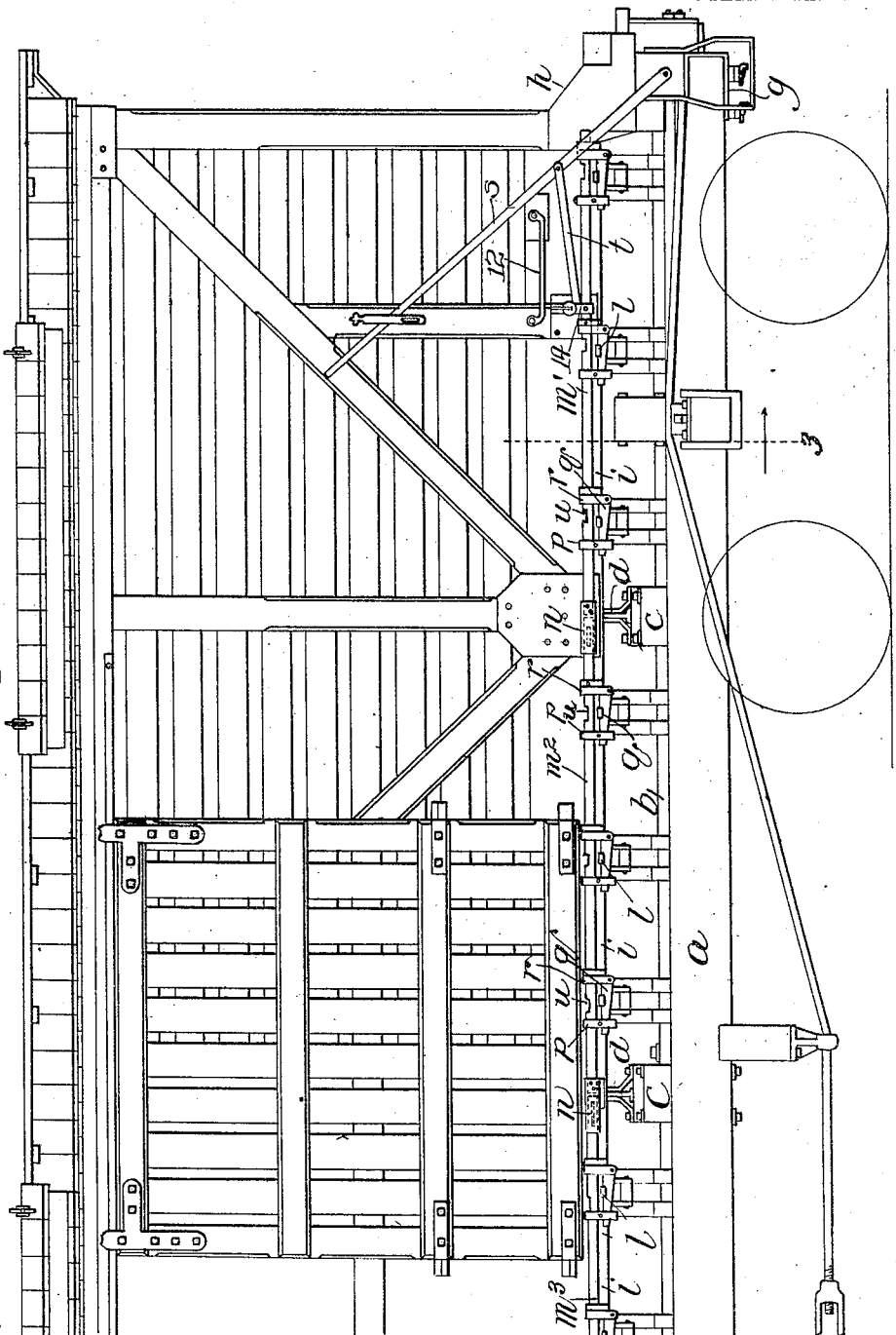

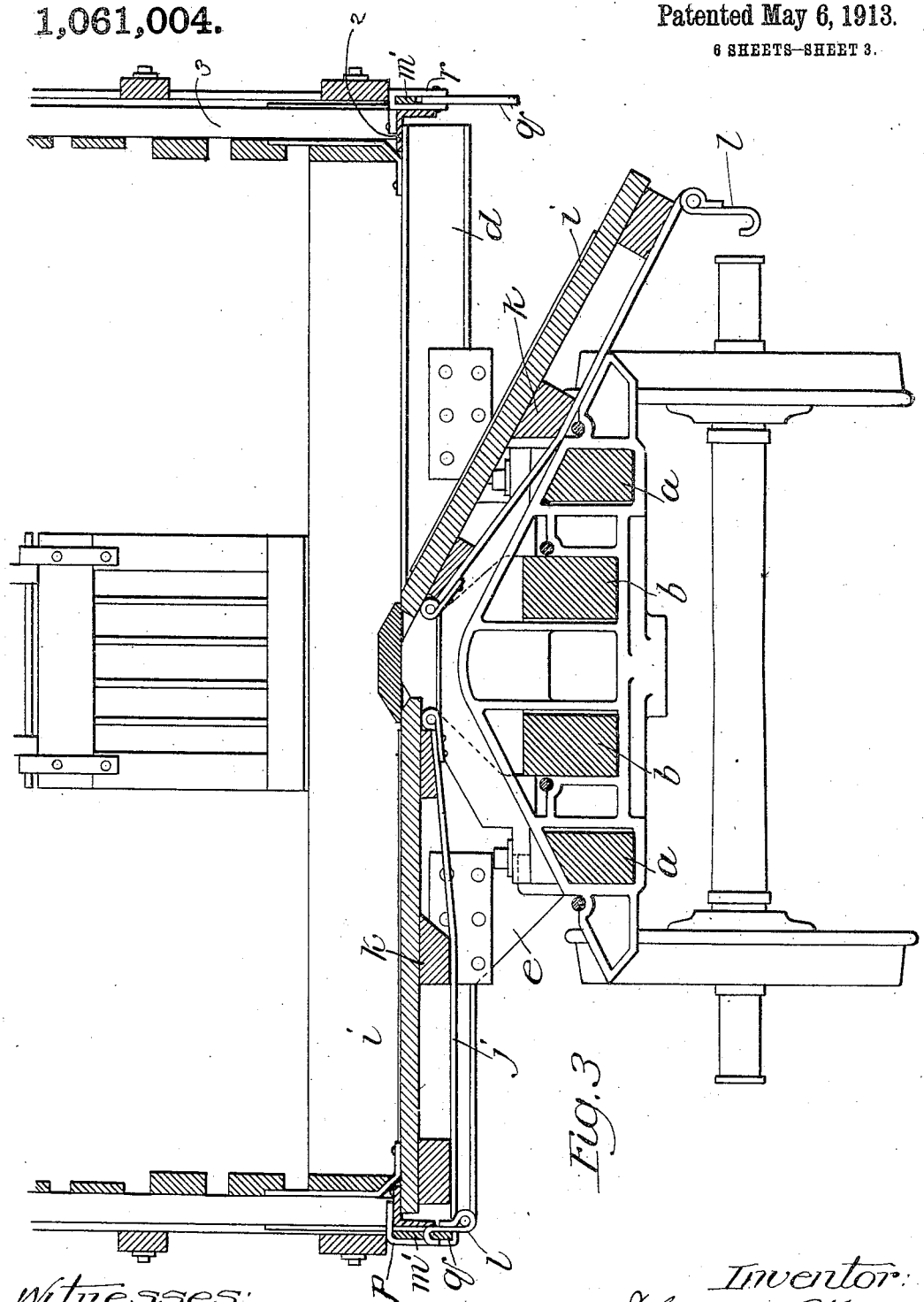

S. OTIS.
DUMP CAR.
APPLICATION FILED JULY 22, 1905.
1,061,004.
Patented May 6, 1913.
6 SHEETS—SHEET 4.
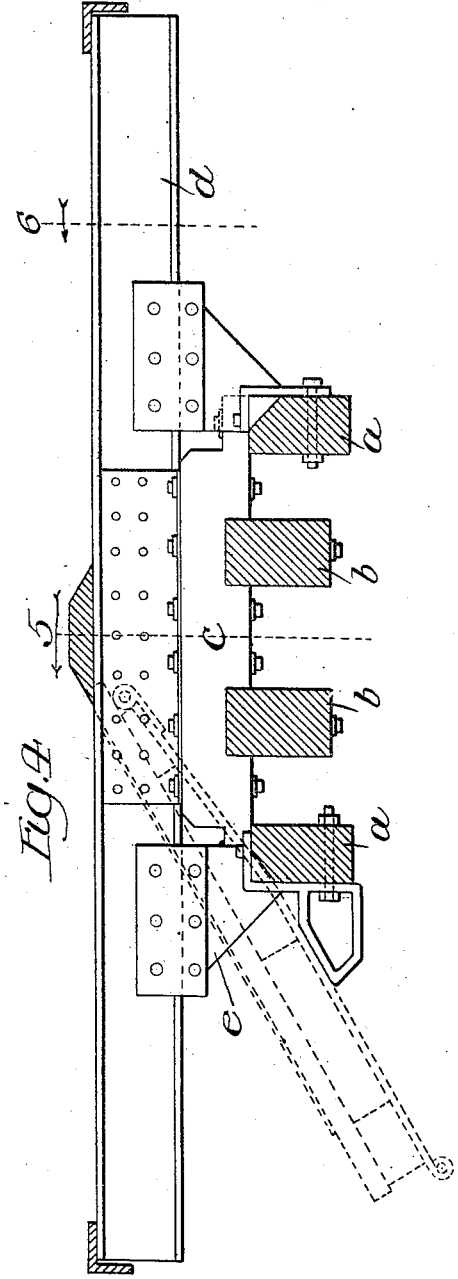
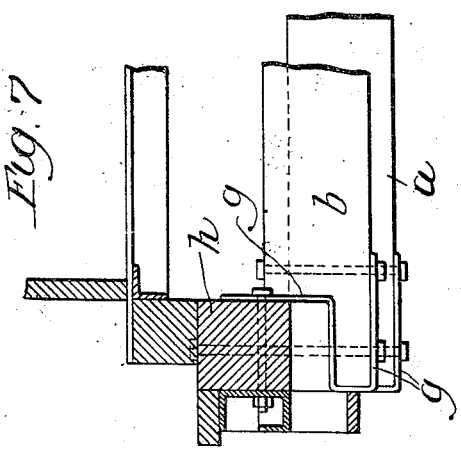
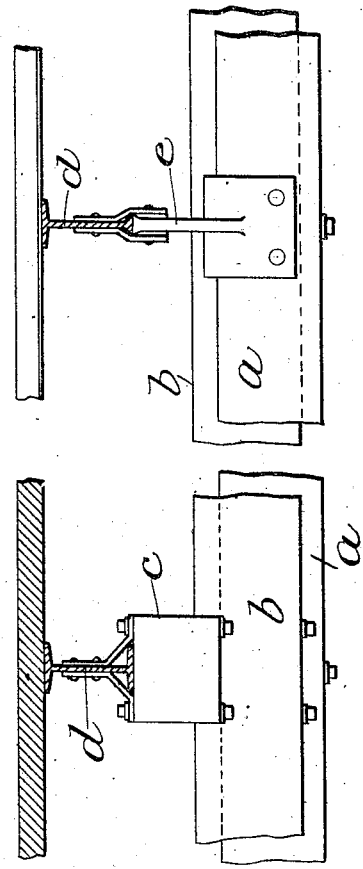
Witnesses
Annie C. Courtenay
Jennie A. McEdward
Inventor:
Spencer Otis
by Thomas F. Sheridan
Atty.

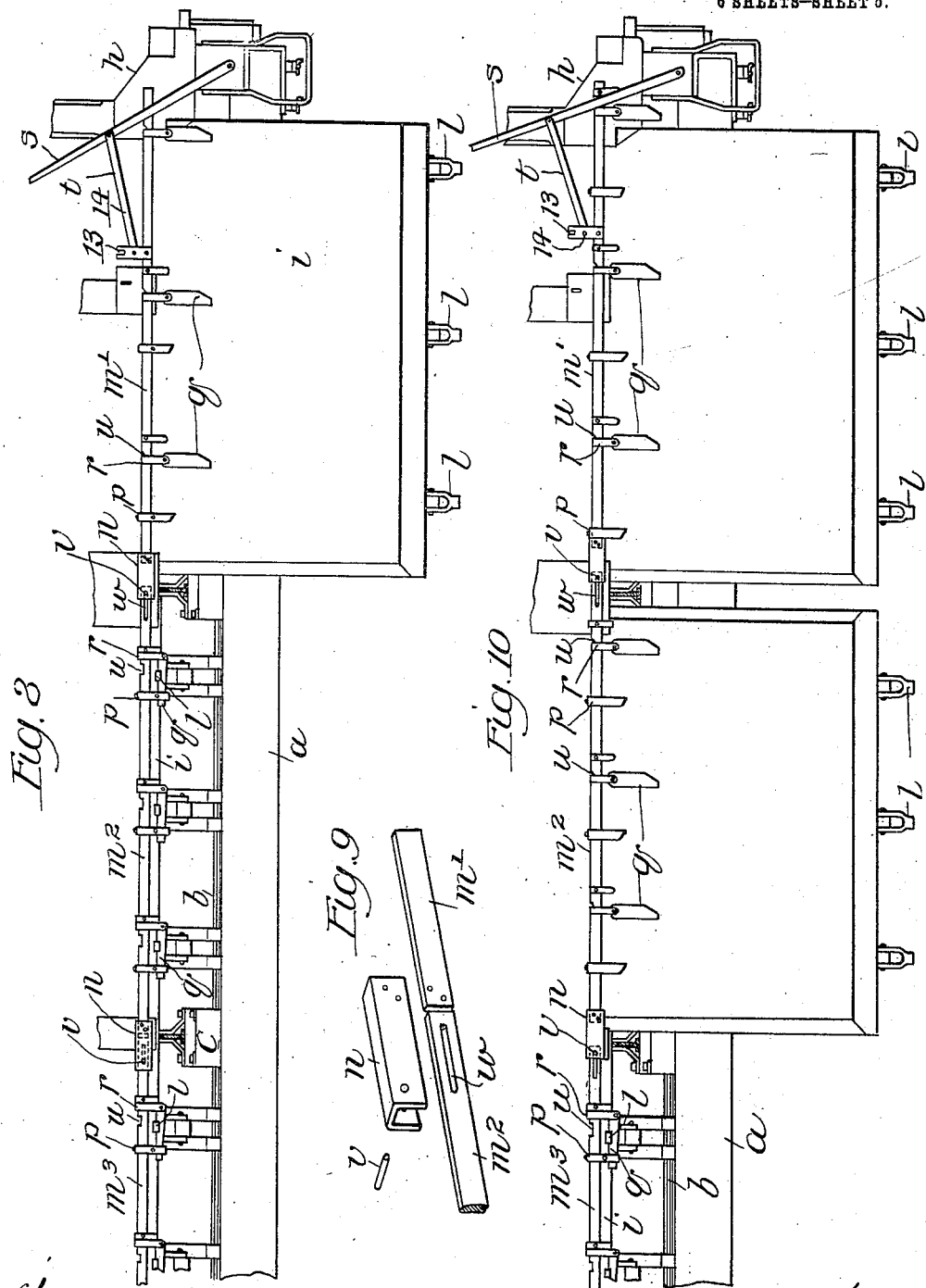

S. OTIS.
DUMP CAR.
APPLICATION FILED JULY 22, 1905.

1,061,004.

Patented May 6, 1913.
6 SHEETS—SHEET 6.

UNITED STATES PATENT OFFICE.

SPENCER OTIS, OF CHICAGO, ILLINOIS, ASSIGNOR, BY MESNE ASSIGNMENTS, TO NATIONAL DUMP CAR COMPANY, A CORPORATION OF MAINE.

DUMP-CAR.

1,061,004. Specification of Letters Patent. Patented May 6, 1913.

Application filed July 22, 1905. Serial No. 270,771.

*To all whom it may concern:*

Be it known that I, SPENCER OTIS, a citizen of the United States, residing at Chicago, Illinois, have invented certain new and useful Improvements in Dump-Cars, of which the following is a specification.

This invention relates particularly to that class of dump cars known in the art as "multi-service" cars, that is, cars which can be used for the purpose of carrying one kind of freight during one trip or season of the year, and other kinds of freight during other trips or seasons of the year.

The invention relates further to an inclosed dumping car—that is, a car preferably of the stock car type, which has partially inclosed side and end portions in which stock may be carried at one season of the year or during one trip, and in which coke, coal, or similar material may be carried during other trips or seasons of the year and be protected from pilferers during its transportation—all of which will be understood and appreciated by those skilled in the art.

The principal object of the invention is to provide a simple, economical and efficient stock car with a dumping bottom and other mechanisms, as hereinafter set forth.

Other and further objects of the invention will appear from an examination of the drawings and the following description and claims.

The invention consists principally in a dump car in which there are combined a supporting frame portion provided with an odd number of dumping spaces forming an open dumping space at the transverse center of the car, and a dumping bottom portion formed of a plurality of swinging sections pivotally secured to the framework of the car and in the spaces between the cross sills.

The invention consists further, and finally, in the features, combinations and details of construction hereinafter described and claimed.

Figure 11:
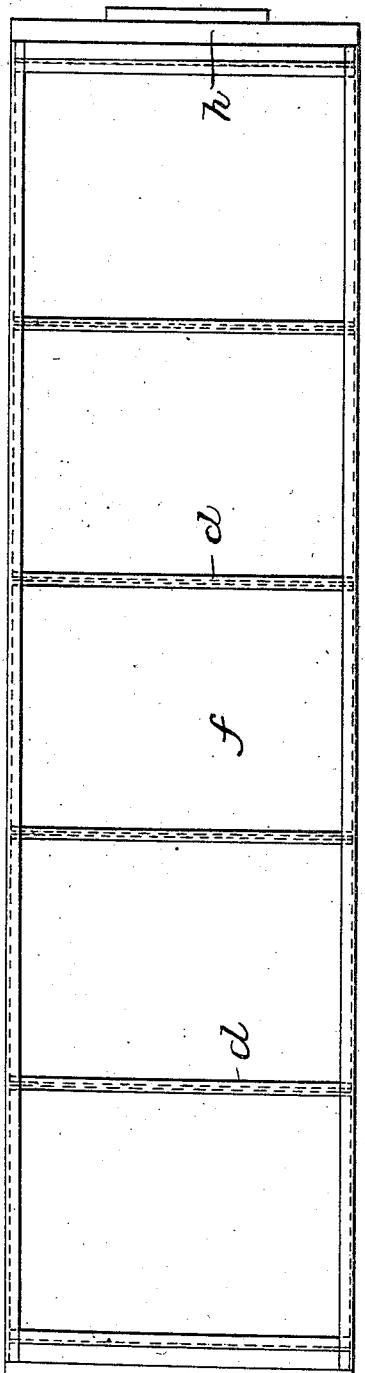
Figure 12:
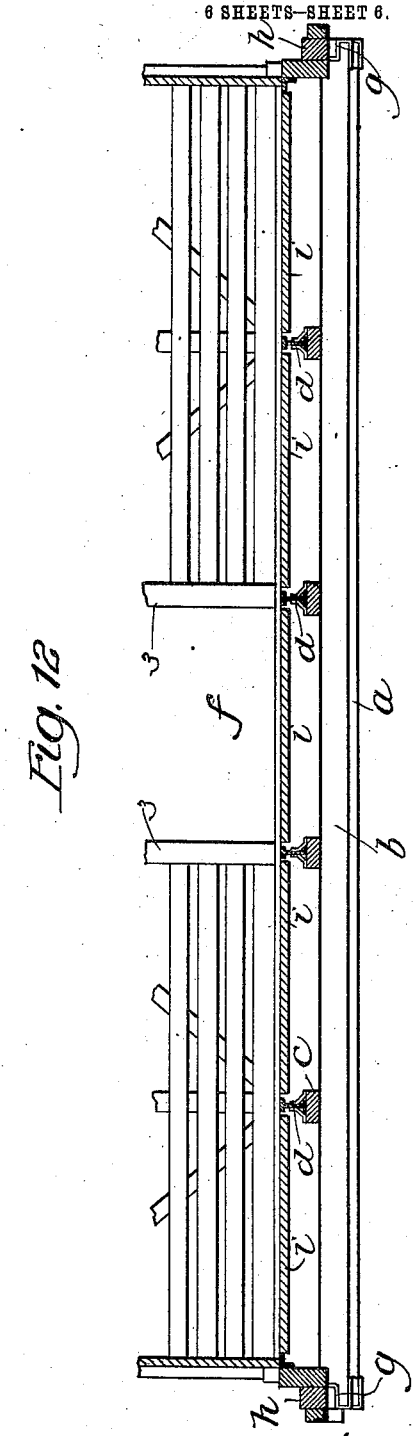

In the accompanying drawings—Figure 1 is an elevation of one end of a car, as it appears when constructed in accordance with these improvements; Fig. 2 an end view of a car, as it appears when constructed in accordance with these improvements; Figs. 2$^a$, 2$^b$, 2$^c$, 2$^d$, 2$^e$ and 2$^f$ are details of the operating rod and latch mechanisms; Fig. 3 an enlarged cross sectional detail, taken on line 3 of Fig. 1 looking in the direction of the arrow; Fig. 4 a cross sectional detail, taken on line 4 of Fig. 1, showing a part of the supporting mechanism as it appears when constructed in accordance with these improvements; Fig. 5 a cross sectional detail, taken on line 5 of Fig. 4 looking in the direction of the arrow; Fig. 6 a similar view, taken on line 6 of Fig. 4 looking in the direction of the arrow; Fig. 7 an enlarged sectional detail, taken on line 7 of Fig. 2 looking in the direction of the arrow; Fig. 8 a portion of the side of the car in elevation, with one of the swinging sections dropped to dumping position; Fig. 9 a perspective view of a portion of an articulated operating rod and connecting joint; Fig. 10 a similar view to that shown in Fig. 8, with two of the doors dropped to dumping position; and Figs. 11 and 12 are a plan view in diagram and sectional elevation of the supporting framework, showing the arrangement of longitudinal sills and cross sills and superstructure with the side door opening of the car.

In illustrating and describing these improvements I have only illustrated and will herein describe that which I consider to be new, taken in connection with so much as is old as is necessary to disclose the invention to others and enable those skilled in the art to practise the same, leaving out of consideration other and well known elements, which if set forth herein, would only tend to confusion, prolixity and ambiguity.

In the art to which this invention relates, it is well known that it is very desirable to provide a framework for a dump car of such construction and arrangement that material may be dumped through the transverse center of the bottom portion and opposite the ordinary side door openings. To accomplish this I provide a supporting framework, having two pairs of longitudinal center sills $a$ and $b$, arranged in different horizontal planes. On these longitudinal center sills and above the same is arranged a plurality of short cross beams $c$, each provided with longer cross beams $d$ extending the entire width of the car from side to side and braced by and secured to the longitudinal beams by means of the diagonal braces $e$. These cross beams—both long and short—are arranged so as to provide, as shown in Fig. 11, a central dumping space $f$ between the same and at the transverse center of the car bottom, opposite the usual side openings $f'$—all of which will be understood and appreciated by those skilled in the art.

Vertical posts 3 rest upon angle irons 2, the latter extending longitudinally of the car over the ends of the cross members $d$. The vertical posts are located over the ends of the cross members and the posts adjacent the center of the car form the side door posts.

In the arrangement of longitudinal beams above described, it becomes desirable to secure them together at their outer ends in such manner as to permit the desired draft rigging—not shown—to be used and to transmit the stress and strains incident to the stopping and starting of the car to all other portions of the supporting framework. For this purpose the ends of each and all of these longitudinal sills are provided with metallic straps $g$, which are bolted thereto and to end sills $h$ at each end of the car. These end sills are laid upon the upper outer ends of these longitudinal beams, directly on the sills $a$, and let into the ends of sills $b$. By this arrangement it will be seen that the usual tenons are dispensed with and the structure simplified and made as strong, if not stronger, than the tenoned structures heretofore used.

As will be seen from the title of this application, this invention relates particularly to the providing of a dump box car of the drop bottom type. In order to provide such drop bottom, a plurality of swinging sections $i$ is provided, each one of which is formed in the shape of a truss—that is, of an upper floor portion laid in a flat plane, lower metallic portions $j$, and interposed struts $k$, all secured together in such a manner as to effectively resist the ordinary strains to which such cars are subjected. These swinging sections are each pivoted at their inner edges to the supporting framework of the car at each side of the longitudinal center, so as to permit them to drop to open or dumping positions, as shown in the drawings. It is very desirable to provide means by which these doors may be dropped to open position independently, or one at a time in a successive manner, so that as much or as little of the contents may be discharged as desired, and when desired. To accomplish this the free edges of each of the swinging doors are provided with a plurality of latches or pivoted hooks $l$, and an articulated jointed operating rod, formed of a plurality of independently movable sections $m^1$, $m^2$ and $m^3$, connected together by means of box joints $n$, is provided at each side of the car and mounted in suitable bearing brackets $p$. Loosely arranged upon this articulated jointed rod is a plurality of locking bars $q$, each of which is pivoted to clips $r$ loosely mounted upon such rod.

Operation: When the parts are in closed position, as shown in Figs. 1 and 3, the hooks are in engagement with the locking bars and the edges of such bars are in engagement with the bearing brackets $p$. In order to open the same, a main lever $s$ is provided and pivoted to the framework of the car by means of a rod connected with the first section $m^1$ of the operating rod. An outward movement of this lever moves the first section of the operating rod until the clips which hold the first set of locking bars in position drop into grooves or notches $u$ in the operating rod. A further movement of this section of the operating rod pulls the locking bar out of engagement with its bearing bracket $p$ and permits the door to drop into open position, as shown in Figs. 8 and 10 and to the right of Fig. 3.

It will be noticed that the articulated operating rod is made in sections, and that a box joint is provided which is fixed to one section by means of rivets or other desired mechanism, and has a sliding engagement with the second section by means of a pin $v$ in the box and a slot $w$ in the end of the next section of the operating rod—all of which permits the first swinging dumping section to be opened before the next succeeding section of the rod is operated. The continued movement of the main lever operates the second section $m^2$ of the articulated rod and liberates its locking bar, as described in connection with the first section, which permits the second swinging section of the drop bottom to open. If it be desired to open the next swinging section of the drop bottom, the main lever is pulled still farther outward—all of which operates the third section $m^3$ of the operating rod until its pivoted locking bars are unlocked, and so on to the end of the car, until all of the swinging, dumping sections, which go to form the drop bottom, are opened.

I claim:

1. In a car of the class described, a series of dumping doors with respective latches therefor, and latch-supporting bars connected in series by lost motion joints.

2. In a car of the class described, a series of dumping doors with latches for each door, a series of latch supporting bars, means connecting successive bars permitting limited movement of one of them without moving the others.

3. In a car of the class described, a series of dumping doors with latches for each door, a series of latch supporting bars, and joints for said bars, each joint consisting of a pin on one bar and a co-acting slot on another bar.

4. In a car of the class described, a series of dumping doors with latches for each door, and a series of latch supporting members with joints between successive members, each joint being so constructed as to permit limited movement of any member in either direction without movement of an adjacent member.

5. In a car of the class described, a series of dumping doors with respective latches therefor, latch supporting bars connected in series by lost motion joints, and means connected to a terminal bar for operating said bars.

6. In a dump car of the class described, the combination of a supporting framework, a dumping bottom portion formed of a plurality of swinging sections made in the shape of a truss composed of upper flat floor portions, lower metallic portions and interposed struts, substantially as described.

7. In a dump car of the class described, a supporting frame portion provided with two pairs of longitudinal sills centrally arranged and extending lengthwise of the car in different horizontal planes, metallic straps passed around the exposed forward ends and under sides of each of said longitudinal sills and bolted thereto, and end sills arranged on the upper ends of said longitudinal sills and bolted thereto and to said metallic straps, substantially as described.

8. In a dump car of the class described, the combination of a plurality of longitudinal sills centrally arranged, a plurality of short cross beams arranged on and secured to said longitudinal sills, a plurality of long cross beams—one for each short cross beam—laid thereon and secured thereto, and diagonal braces secured to the long cross beams and the longitudinal sills, substantially as described.

SPENCER OTIS.

Witnesses:
 HARRY I. CROMER,
 ANNIE C. COURTENAY.

---

Copies of this patent may be obtained for five cents each, by addressing the "Commissioner of Patents, Washington, D. C."